(12) United States Patent
Liu et al.

(10) Patent No.: US 6,923,504 B1
(45) Date of Patent: Aug. 2, 2005

(54) VEHICLE SEAT BACK RECLINER AND ASSEMBLY

(75) Inventors: Hsing Lung Lewis Liu, Novi, MI (US); Karl A. Murphy, Novi, MI (US)

(73) Assignee: Porter Group, LLC, Novi, MI (US)

( * ) Notice: Subject to any disclaimer, the term of this patent is extended or adjusted under 35 U.S.C. 154(b) by 0 days.

(21) Appl. No.: 10/899,901

(22) Filed: Jul. 27, 2004

(51) Int. Cl.[7] .............................................. B60N 2/235
(52) U.S. Cl. ..................................................... 297/367
(58) Field of Search ........................... 297/367, 378.12

(56) References Cited

U.S. PATENT DOCUMENTS

| | | | |
|---|---|---|---|
| 4,659,146 A * | 4/1987 | Janiaud | 297/367 |
| 4,770,464 A | 9/1988 | Pipon et al. | |
| 4,997,223 A | 3/1991 | Croft | |
| 5,216,936 A | 6/1993 | Baloche | |
| 6,003,945 A | 12/1999 | Kojima | |
| 6,007,152 A | 12/1999 | Kojima et al. | |
| 6,007,153 A * | 12/1999 | Benoit et al. | 297/378.12 |
| 6,039,400 A | 3/2000 | Yoshida et al. | |
| 6,102,480 A | 8/2000 | Asano | |
| 6,260,923 B1 | 7/2001 | Yamada et al. | |
| 6,318,805 B1 * | 11/2001 | Asano | 297/367 |
| 6,328,382 B1 | 12/2001 | Yamashita | |
| 6,332,649 B1 | 12/2001 | Vossmann | |
| 6,454,354 B1 | 9/2002 | Vossmann et al. | |
| 6,543,849 B1 * | 4/2003 | Yamada | 297/367 |
| 6,561,585 B2 * | 5/2003 | Cilliere et al. | 297/367 |

FOREIGN PATENT DOCUMENTS

JP 1 - 104201 4/1989

* cited by examiner

*Primary Examiner*—Peter R. Brown
(74) *Attorney, Agent, or Firm*—Brooks Kushman P.C.

(57) ABSTRACT

A vehicle seat back recliner assembly (20) includes a pair of recliners (22) each of which has a locking mechanism (32) including an operator (74) having a control lever (76) that pivots in opposite directions to provide recliner locking and unlocking. The control lever is pivoted in one direction to move a pair of toothed pawls (68) through a pair of cams (72) to provide locking, and the control lever is pivoted in the other direction to move the cams so as to permit movement of the pawls for the unlocking and to also move the pawls from the locking positions to the unlocked positions to permit recliner adjustment. A release mechanism (32) of the recliner assembly includes a release actuator (82) and a cable assembly (84) that insure unlocking of both recliners (22) upon an unlocking actuation.

13 Claims, 5 Drawing Sheets

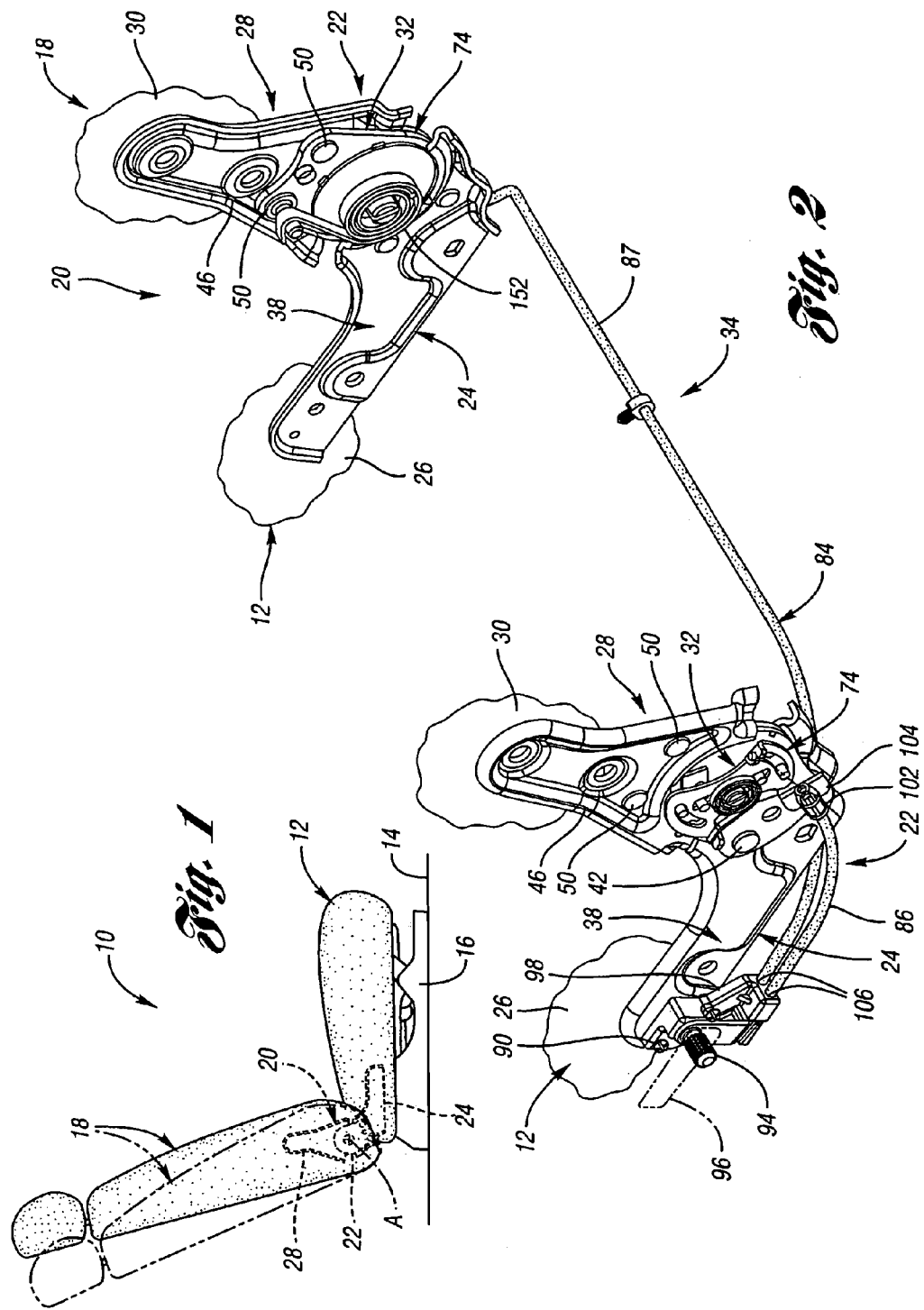

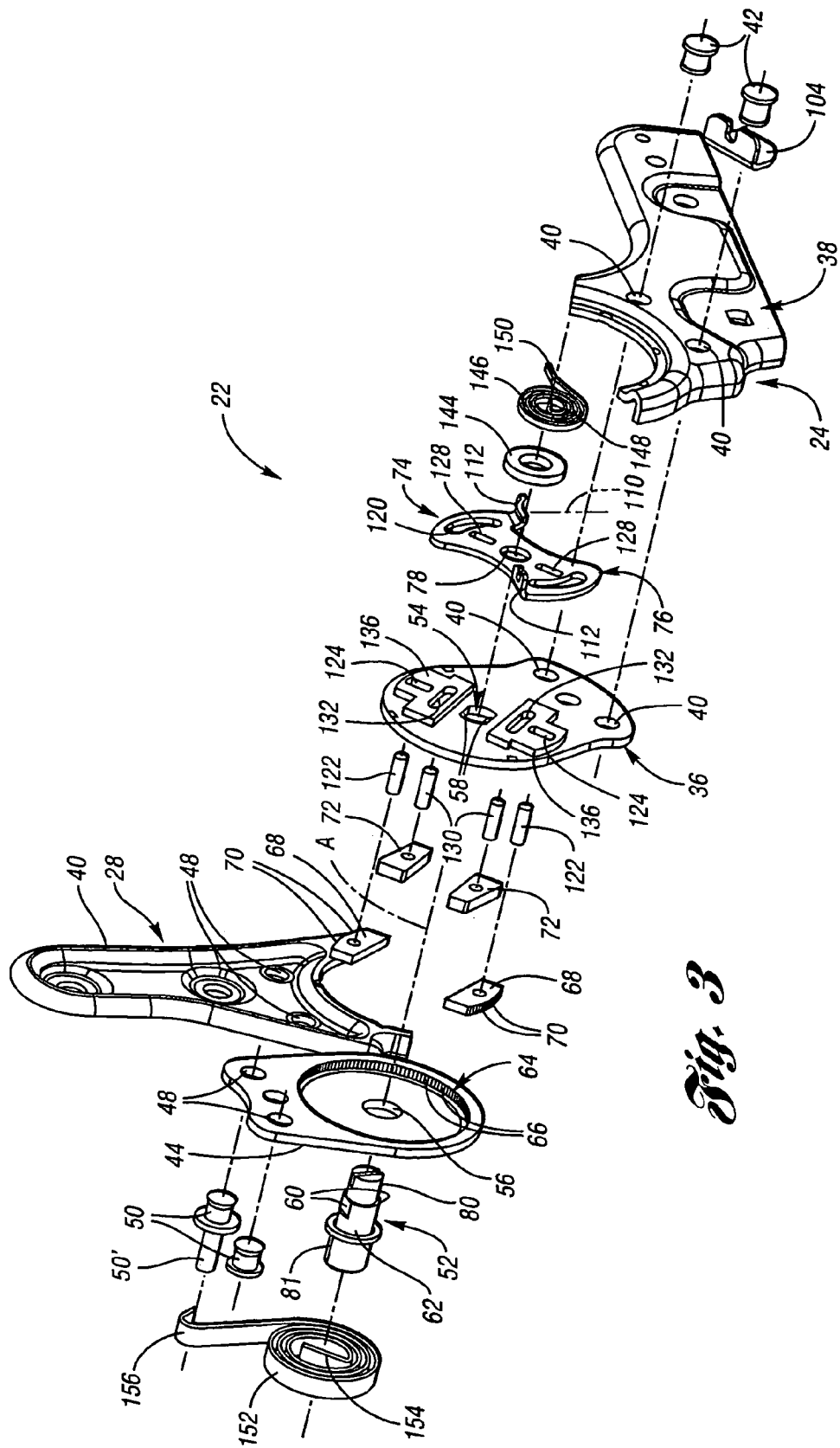

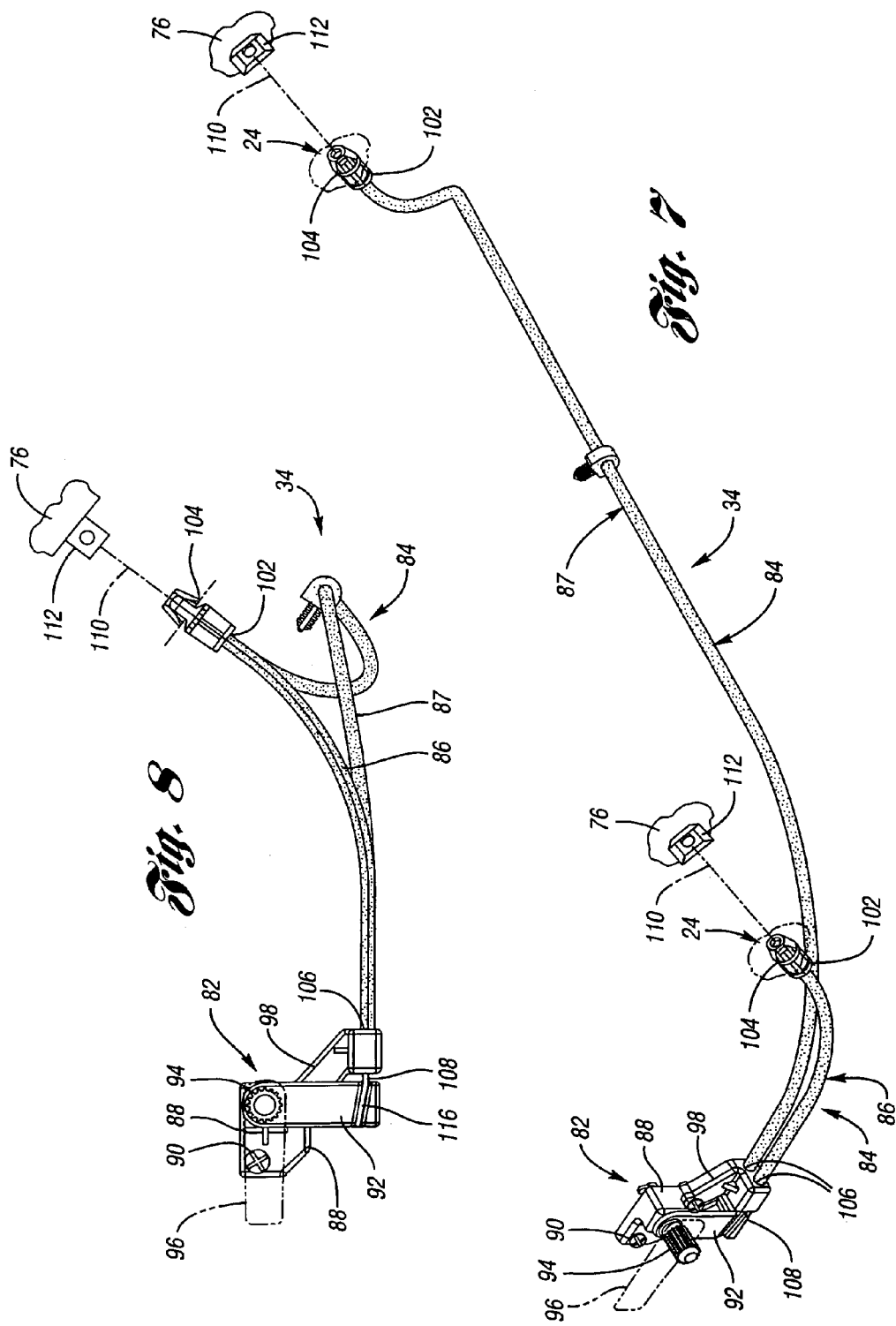

VEHICLE SEAT BACK RECLINER AND ASSEMBLY

BACKGROUND OF THE INVENTION

1. Field of the Invention

This inventions relates to a vehicle seat back recliner and an assembly of the recliners for permitting tilting adjustment of a seat back with respect to an associated seat cushion of a vehicle seat.

2. Background Art

Vehicle seat back recliners of the "rotary" type conventionally include a stationary member mounted on the associated seat cushion and a pivotal member that is mounted for pivotal movement about a pivotal axis on the stationary member to mount a seat back. A locking mechanism controls the adjusted position of the pivotal member on the stationary member to control the tilted orientation of the seat back. Such recliners can position the seat back generally upright for normal seating at a selected angular position, rearwardly for reclined seating, forwardly for access to the rear of the seat and/or horizontally in a forward direction for cargo usage.

Conventional locking mechanisms of the rotary type of seat back recliners include a toothed locking ring on the pivotal member and a plurality of pawls mounted on the stationary member for movement between locking and unlocked positions with respect to the toothed ring under the control of a single cam that rotates around the pivotal axis of the recliner and has cam lobes engaging each of the pawls. With such a construction, full locking engagement of one of the toothed pawls with the toothed locking ring can prevent farther cam movement and complete locking of each other pawl.

Prior vehicle seat back recliners include: U.S. Pat. No. 4,770,464 Pipon et al.; U.S. Pat. No. 4,997,223 Croft; U.S. Pat. No. 5,216,936 Baloche; U.S. Pat. No. 6,003,945 Kojima; U.S. Pat. No. 6,007,152 Kojima et al.; U.S. Pat. No. 6,039,400 Yoshida et al.; U.S. Pat. No. 6,102,480 Asano; U.S. Pat. No. 6,260,923 Yamada et al.; U.S. Pat. No. 6,328,382 Yamashita; U.S. Pat. No. 6,332,649 Vossmann; and U.S. Pat. No. 6,454,354 Vossmann et al.; and also include Japanese Patent Publication 1-104201.

SUMMARY OF THE INVENTION

An object of the present invention is to provide an improved vehicle seat back recliner.

In carrying out the above object, the vehicle seat back recliner of the invention includes a stationary member for mounting on a vehicle seat cushion of a vehicle seat with which the recliner is to be used. The recliner also includes a pivotal member that is mounted for pivotal movement about a pivotal axis on the stationary member and that is adapted to mount a seat back of the vehicle seat. A locking mechanism of the recliner selectively permits pivotal adjustment and locking of the pivotal position of the pivotal member on the stationary member to pivotally position the seat back with respect to the seat cushion. The locking mechanism includes a toothed locking ring on the pivotal member. A pair of toothed pawls are mounted on the stationary member for radial movement with respect to the pivotal axis at diametrically opposite locations between locking positions where the pawls are engaged with the toothed locking ring to permit pivotal movement of the seat back with respect to the seat cushion and unlocked positions where the pawls are disengaged from the locking ring to permit pivotal movement of the seat back with respect to the seat cushion. A pair of separate cams are respectively associated with the pair of pawls and the cams are movable with respect to each other and with respect to the pawls on opposite sides of the pivotal axis to respectively slidingly engage the pair of pawls. An operator of the locking mechanism includes a control lever that is pivoted about the pivotal axis in one direction to move the pair of cams so as to move the pair of pawls to the locking position. The control lever is pivoted about the pivotal axis in the other direction to move the cams so as to permit movement of the pawls toward the unlocked positions and also moving the pawls from the locking positions to the unlocked positions to permit movement of the pivotal member about the pivotal axis.

Another object of the present invention is to provide an improved vehicle seat recliner assembly.

In carrying out the above object, the vehicle seat recliner assembly of the invention includes a pair of the recliners as described above for mounting laterally from each other on the vehicle seat. A release mechanism of the recliner assembly includes a release actuator and a cable assembly that extends from the release actuator to each of the recliners. The cable assembly includes a sheathing having a pair of ends respectively connected to the stationary members of the pair of recliners and having a pair of intermediate connections to the release actuator. The cable assembly also includes a cable wire that extends through the sheathing and has opposite ends respectively connected to the control levers and also has an intermediate portion that extends to the release actuator and is moved thereby to pivot each control lever in the other direction to move the cams of the recliners so as to permit movement of the pawls of the recliners toward the unlocked positions and also moving the pawls from the locking positions to the unlocked positions to permit movement of the pivotal members of the recliners about the pivotal axis.

The cable wire of the cable assembly is preferably continuous between its opposite ends.

The operator of the vehicle seat back recliner of the invention includes first and second pairs of connections. The pair of first connections each include a curved cam surface and an axial pin that cooperate between the control lever and one of the pawls such that the first pair of connections moves the pair of pawls from the locking positions to the unlocked positions upon pivoting of the control lever about the pivotal axis in the other direction. The second pair of connections each includes a radial slot and an axial pin that connect the control lever and one of the cams such that the second pair of connections move the cams upon pivoting of the control lever about the pivotal axis.

The recliner also has the pair of pawls and the pair of cams located between the stationary member and the pivotal member. The stationary member has a pair of pockets each of which receive one of the pawls and its associated cam, while the control lever is located along the pivotal axis on the opposite side of the stationary member from the pawls and the cams. A spring pivotally biases the control lever about the pivotal axis in the one direction to move the pair of cams so as to move the pair of pawls to the locking positions.

A pivotal connector of the recliner extends along the pivotal axis through and between the stationary member and the pivotal member. This pivotal connector is pivotally fixed to the stationary member and supports the pivotal member for its pivotal movement about the pivotal axis. A first end of the pivotal connector pivotally supports the control lever, and the spring extends between the first end of the pivotal connector and the control lever to provide the biasing of the control lever in the one direction. A second end of the pivotal connector is located on the opposite axial side of the stationary and pivotal members as the control lever, and a second spring extends between the second end of the pivotal connector and the pivotal member to bias the pivotal member in a seat back forward direction.

The first mentioned spring is a spiral spring having an inner end connected to the first end of the pivotal connector and an outer end connected to the control lever to provide the pivotal biasing of the control lever. The second spring is also a spiral spring having an inner end connected to the second end of the pivotal connector and an outer end connected to the pivotal member to provide the pivotal biasing thereof in the seat back forward direction.

The stationary member and pivotal member each include a plate between the pawls and cams are mounted, and the stationary member and pivotal member each also include a bracket connected to the plate thereof and operable to respectively provide connection of the recliner to the seat cushion and the seat back.

The objects, features and advantages of the present invention are readily apparent from the following detailed description of the preferred embodiment when taken in connection with the accompanying drawings.

BRIEF DESCRIPTION OF THE DRAWINGS

FIG. 1 is a side elevational view of a vehicle seat including vehicle seat recliner assembly that is constructed in accordance with the present invention and also includes a pair of recliners construction in accordance with the invention.

FIG. 2 is a perspective view of the vehicle seat recliner assembly of the invention.

FIG. 3 is an exploded perspective view of one of the recliners and is also illustrative of the other recliner.

FIG. 7 is a perspective view of a release mechanism that releases the pair of recliners of the recliner assembly to permit the seat back pivotal adjustment.

FIG. 8 is a side view of the release mechanism.

DETAILED DESCRIPTION OF THE PREFERRED EMBODIMENT

Figure 4:
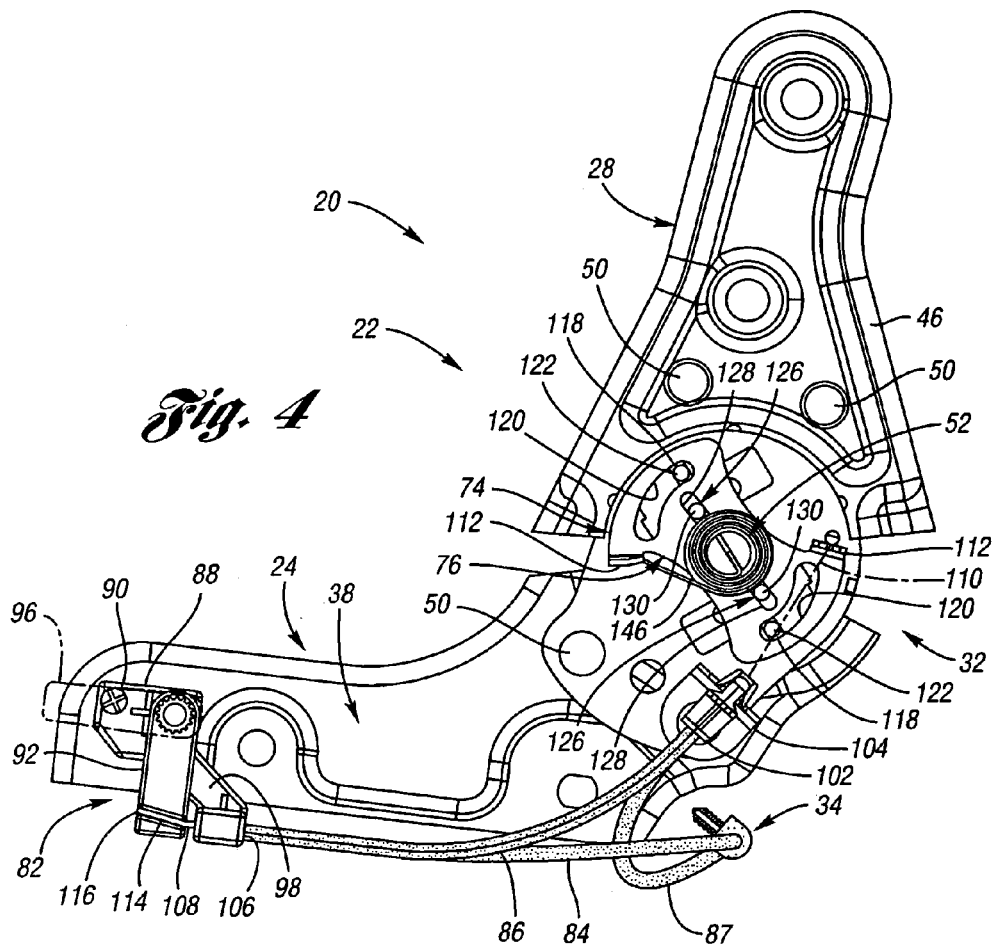
FIG. 4 is a side elevational view of the recliner assembly showing one of the recliners and a release mechanism that is operable to release the recliners to permit pivotal adjustment of the seat back of the seat with which the recliner assembly is utilized.

With reference to FIG. 1, a vehicle seat generally indicated by 10 includes a seat cushion 12 that is mounted on the vehicle floor 14 either fixedly or by a longitudinally adjustable seat adjuster 16. Seat 10 also includes a seat back 18 that is mounted and pivotally positioned with respect to the seat cushion 12 by a recliner assembly 20 that is constructed in accordance with the present invention. This recliner assembly 20 as illustrated in FIG. 2 includes a pair of recliners 22 that are mounted laterally from each other on the vehicle seat. The recliner assembly 20 and recliners 22 thereof can be utilized to adjust the tilted position of the seat back 18 as shown by solid and phantom line positions and can also be utilized to permit farther reclining rearwardly, forward tilting of the seat back to permit access to and from the rear of the seat such as is conventional with two door vehicle seats to facilitate the access room to the rear seat, or forward tilting to a horizontal position for cargo usage. Both the recliner assembly 20 and the recliners 22 will be described in an integrated manner to facilitate an understanding of all aspects of the invention.

With reference to FIG. 2, each recliner 22 of the recliner assembly 20 includes a stationary member 24 for mounting on the vehicle seat cushion 12, specifically to a schematically illustrated frame 26 of the seat cushion. A pivotal member 28 of each recliner 22 is mounted for pivotal movement about a pivotal axis A on the stationary member 24 and is adapted to mount the seat back 18 by connection to a schematically illustrated frame 30 of the seat back. A locking mechanism of each recliner 22 is collectively indicated by 32 and selectively permits pivotal adjustment or locking of the pivotal position of the pivotal member 28 on the stationary member 24 to pivotally position the seat back 18 with respect to the seat cushion 12. The two recliners 22 have symmetrical constructions to each other about a vertical longitudinal plane of the seat such that only one recliner need be described to understand the construction of both recliners. In addition to these recliners 22, the recliner assembly 20 includes a release mechanism 34 that extends between the pair of recliners and is operable to release the recliners to permit pivotal movement of the pivotal members 28 and the seat back 18 as is hereinafter more fully described.

With reference to FIG. 3, each recliner 22 has its stationary member 24 constructed to include a plate 36 and a bracket 38 having holes 40 through which suitable connectors 42 extend to secure the plate to the bracket. The stationary member bracket 38 is operable to provide connection of the recliner to the seat cushion frame in any suitable manner. Likewise, the pivotal member 28 includes a plate 44 and a bracket 46 that have holes 48 through which suitable connectors 50 extend to secure the plate to the bracket. The pivotal member bracket 46 is secured in any suitable manner to the seat back frame to provide its mounting with respect to the seat cushion. As is hereinafter more fully described, a pivotal connector 52 of each recliner extends through holes 54 and 56 in the stationary member plate 36 and the pivotal member plate 44, respectively. More specifically, the pivotal member plate 36 has its hole 54 provided with flats 58 that are engaged with flats 60 on the pivotal member 52 such that the pivotal connector is pivotally fixed with respect to the stationary member plate 36, while the hole 56 of the pivotal member plate 44 is round and engaged with a round portion 62 of the pivotal connector 52 so that the pivotal member plate and the pivotal member 28 pivotally support the associated seat back for pivoting about axis A.

With continuing reference to FIG. 3, the pivotal member plate 44 includes a toothed locking ring 64 having teeth 66 extending about the pivotal axis A. This toothed locking ring as shown in FIG. 3 extends the full 360° about the pivotal axis A, which is desirable for permitting versatility of recliner manufacturing from tooling so that one tool can produce recliners that position the seat back at various tilted positions. However, it should be appreciated in its broadest aspects, the toothed locking ring could also be constructed with partial toothed segments that only have teeth at partial angular extends around the pivotal axis A.

Figure 5:
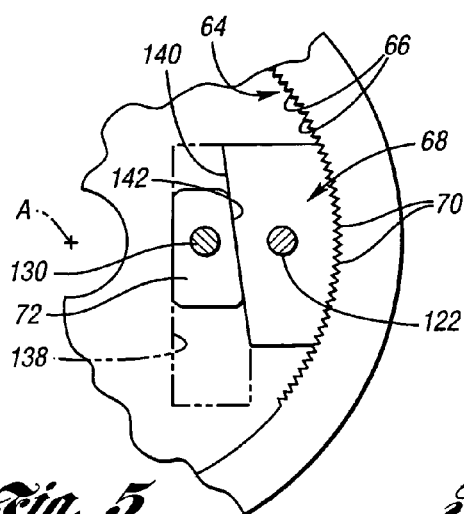
FIG. 5 is a partial view illustrating the manner in which pawls and cams of the recliner provide a locked condition.
Figure 6:
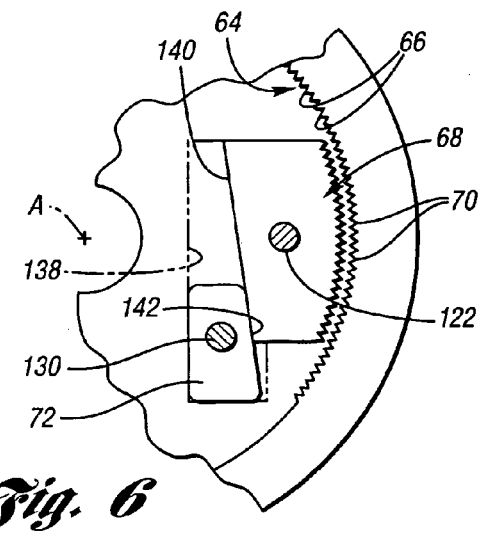
FIG. 6 is a view similar to FIG. 5 but showing the recliner with the pawls and cams in an unlocked condition so as to permit pivotal adjustment of the seat back.

The locking mechanism 32 is illustrated in FIG. 3 as including a pair of toothed pawls 68 having teeth 70 as shown in FIGS. 5 and 6. The pair of toothed pawls 68 shown in FIG. 3 are mounted on the plate 36 of stationary member 24 for radial movement with respect to the pivotal axis A at diametrically opposite locations between locking positions as illustrated in FIG. 5 and unlocked positions as illustrated in FIG. 6. In the locking position of FIG. 5, the teeth 66 of the toothed locking ring 64 are engaged by the teeth 70 of the toothed pawl 68 to prevent pivotal movement of the pivotal member about the stationary member so that the seat back is fixed with respect to the seat cushion. In the unlocked position of FIG. 6, the teeth 66 of the toothed locking ring 64 are disengaged from the teeth 70 of the pawl 68 so as to permit the pivotal movement of the pivotal member about pivotal axis A such that the seat back can pivot with respect to the seat cushion.

With further reference to FIG. 3, the locking mechanism 32 also includes a pair of separate cams 72 respectively associated with the pair of pawls 68 and movable with respect to each other and with respect to the pawls on opposite sides of the pivotal axis A to respectively slidingly engage the pair of pawls as illustrated in FIGS. 5 and 6.

As shown in FIGS. 3 and 4, an operator 74 of the locking mechanism 32 includes a control lever 76 having a central round hole 78 through which a first round end 80 of the pivotal connector 52 extends such that the control lever pivots about the pivotal axis A. Upon counterclockwise pivoting of the control lever 76 as illustrated in FIG. 4, the pair of cams 72 are moved to move the pair of pawls 68 from their unlocked positions as illustrated in FIG. 6 to their locked positions as illustrated in FIG. 5 so as to prevent pivoting of the pivotal movement and the seat back supported thereby on the seat cushion. Pivoting of the control lever 76 in the clockwise direction moves the cams 72 so as to permit the toothed pawls 68 to move from their locking positions as illustrated in FIG. 5 to their unlocked positions as illustrated in FIG. 6 and the operator also then moves the pawls 68 from their locking positions illustrated in FIG. 5 to their unlocked positions illustrated in FIG. 6. The pivotal connector 52 as shown in FIG. 3 also has a second end 81 located on the opposite side of the plates 36 and 44 from the control lever 76 in the assembled condition as is hereinafter more fully described.

Figure 9:
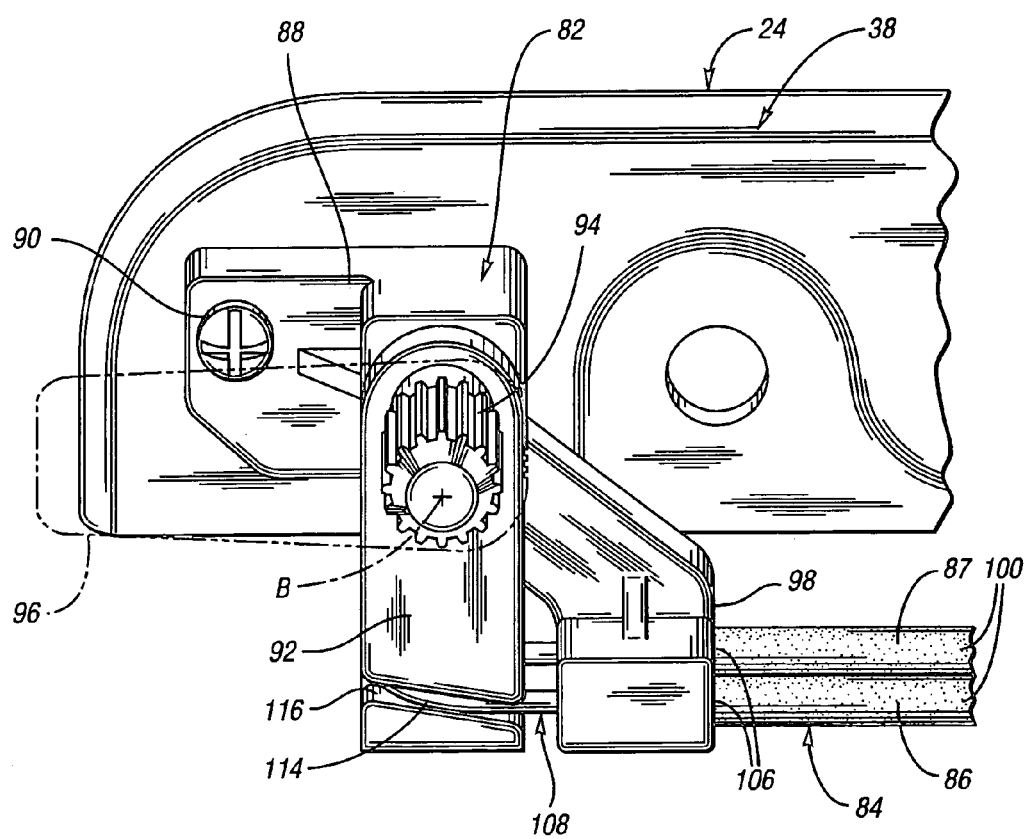
FIG. 9 is an enlarged view of a portion of the release mechanism to further illustrate its construction.

With reference to FIG. 2, the release mechanism 34 includes a release actuator 82 and a cable assembly 84 having portions 86 and 87 that respectively extend from the release actuator to each of the pair of recliners 22. The release actuator 82 as illustrated in FIGS. 7–9 includes a connector member 88 that is mounted in any suitable manner on the stationary member 24 of one of the recliners 22, specifically by a bolt or screw 90 to the bracket 38 of the stationary member as shown best in FIG. 9. A release lever 92 is pivotally supported on the connector member 88 and has a splined actuating shaft 94 for receiving a handle 96 that pivots the lever 92 about an axis B. A connector leg 98 of connector member 88 extends downwardly adjacent the release lever 92 to the cable assembly 84. The cable assembly 84 includes a sheathing 100 having a pair of ends 102 which are each connected to the stationary member of one of the recliners specifically by a connector flange 104 which, as shown in FIG. 3, is secured to the bracket 38 of the stationary member 24 by one of the connectors 42 that secures this bracket to the plate 36 of the stationary member. As shown best in FIG. 9, the sheathing 100 of cable assembly 84 also has a pair of intermediate connections 106 to the connector leg 98 of the connector member 88 of release actuator 82. A cable wire 108 of cable assembly 84 is best illustrated in FIG. 9 and extends through the sheathing 100. This cable wire 108 has opposite ends 110 that extend past the sheathing ends 102 to associated connections 112 of the control levers 76 of the pair of recliners. The cable wire 108 may be of a single metal wire strand, multiple wire strands or single or multiple synthetic plastic strands, etc. At the cable wire ends 110, a ball or other formation is secured to the connection flange 112 of the adjacent control lever 76. It will be noted in FIGS. 3 and 4 that the control lever 76 actually has two of the connection flanges 112, even though only one is used, so that the same control lever can be used with either of the two symmetrical recliners 22.

Cable wire 108 as shown in FIG. 9 also includes an intermediate portion 114 that extends from the sheathing connections 106 at the connector leg 98 around the release lever 92 within a groove 116 thereof with a generally U shape. Upward movement of the handle 96 pivots the control lever 92 clockwise and pulls on the cable wire 108 within both cable portions 86 and 87 to thereby pull the cable wire ends 110 shown in FIG. 7 toward the connected sheathing ends 102 in order to pivot the control levers to unlock the recliners. Specifically, such operation of the release actuator 82 pivots each control lever 76 clockwise as shown in FIG. 4 to provide the unlocking as is also hereinafter more fully described.

As illustrated in FIG. 4, the operator 74 of locking mechanism 32 includes a pair of first connections 118 each of which includes a curved cam surface 120 and an axial pin 122 that cooperate between the control lever and one of the toothed pawls such that the first pair of connections moves the pair of pawls from the locking positions of FIG. 5 to the unlocked positions of FIG. 6 as the control lever pivots clockwise under the operation of the release actuator 82 as previously described. More specifically, the axial pin 122 of each of the first connections 118 extends from the associated toothed pawl 68 through an associated radial slot 124 in the stationary member plate 36 as shown in FIG. 3 and through an arcuate slot whose radial outer side is defined in the control lever by the cam surface 120. This cam surface 120 spirals radially inward a slight extent in the counterclockwise direction such that the clockwise pivoting of the control lever 74 causes the cam surface to move the pin 122 radially inward and thereby move the associated toothed pawl 68 from the locking position shown in FIG. 5 to the unlocked position of FIG. 6 so that the recliner is released for tilting adjustment of the seat back.

The operator 74 of locking mechanism 32 also as shown in FIG. 4 includes a pair of second connections 126 each of which includes a radial slot 128 in the control lever 74 as also illustrated in FIG. 3, and each second connection also includes an axial pin 130. The axial pin 130 of each second connection 126 extends from one of the cams 72 through a straight slot 132 in the plate 36 of stationary member 24 and into the radial slot 128 in the control lever 76. As such, the second pair of connections 126 move the pair of cams 72 between the position of FIG. 5 and the position of FIG. 6 as the control lever is pivoted in opposite directions.

As shown in FIG. 3, the stationary member plate 34 has pocket formations 136 that provide this plate with pockets 138 as shown in FIGS. 5 and 6. The pair of pockets 138 of the stationary plate 136 are located at diametrically opposite locations on the opposite sides of pivotal axis A and receive the toothed pawls 68 for radial movement as well as receiving the cam 72 for movement perpendicular to the radial direction. Each toothed pawl 68 has a slide surface 140 that is inclined with respect to a radial direction, and each cam 72 has a slide surface 142 that is also inclined with respect to a radial direction and in contact with the slide surface 140 of the associated pawl 68. The control lever 76 as shown in FIG. 3 is located on the opposite side of the stationary member plate 36 from the pawls 68 and cams 72. A bushing 144 shown in FIG. 3 extends around the first end 80 of the pivotal connector 52, and a first spring 146 pivotally biases the control lever 76 about the pivotal axis in a counterclockwise direction so that the cams 72 move the toothed pawls 68 to the locking positions illustrated by FIG. 5. This spring 146 is of the spiral type having an inner end 148 received within a slot in the first end 80 of the pivotal connector, and spring 146 has an outer end 150 that engages the control lever to provide counterclockwise biasing that maintains the locked condition of the recliner. Furthermore, a second spring 152 of the recliner is shown in FIG. 3 as extending between the second end 81 of the pivotal connector 52 and the pivotal member 28 at a connector end portion 50' of one of the connectors 50 that connects the pivotal member plate 44 and the pivotal member bracket 46. This spring 152 biases the recliner in a seat back forward direction and is preferably of the spiral type having an inner end 154 received within a slot in the second end 81 of pivotal connector 52 and having an outer end 156 of a hook shape that is received by the connector end 50' to provide the seat back forward biasing.

The separate construction of the toothed pawls 68 and the cams 72 along with tolerances such as between the hole 56 of the pivotal member plate 44 and the round portion 62 of the pivotal connector 52 insures that both toothed pawls are fully locked even when one engages the toothed ring 64 before the other. Specifically, upon such initial engagement when one cam 72 has fully locked its associated pawl 68, the tolerances and separate construction of the cams 72 from the toothed pawls 68 permits the other cam to continue moving and fully lock its associated pawl in a manner that is not possible if the pawl and cam are of a one piece construction. Furthermore, upon release operation by the release actuator 82 as previously described, the movement of the control lever insures movement of the toothed pawl 68 out of engagement with the toothed locking ring 64 and maintains such disengagement during the recliner adjustment. Furthermore, the radial spiraling of the cam surfaces 120 is such that upon unlocking the cams 72 move rectilinearly a certain angular extent before the toothed pawls 68 begin to move radially inward under the operation of the first and second connections previously described. This sequence of movement ensures that there is no binding of the toothed pawls 68 and cams 72 upon the unlocking.

Upon upward movement of the release handle 96 of the release actuator 82 shown in FIG. 9, the release lever 92 pulls of the U-shaped intermediate portion of the cable wire 108. The cable wire ends 110 shown in FIG. 3 then pull on the control levers 76 to provide the unlocking as previously described. If one recliner unlocks before the other one, the manner in which the unlocking force is applied to the U-shaped intermediate portion 114 of cable wire 108 as shown in FIG. 9 continues to apply the unlocking force to the other recliner until it unlocks.

It is preferable for the cable wire 108 to be continuous between its opposite ends 110 to facilitate the unlocking operation and reduce the number of components that must be supplied and inventoried. However, it should be appreciated that the cable assembly can also include a pair of cable wires that extend between the release actuator 82 and the pair of recliners 22 and still function, such as by having their ends adjacent the release actuator connected to opposite ends of a common lever of the release actuator so pivoting of the lever on a movable operator of the release actuator ensures that both recliners are released upon the release actuation. Nevertheless, as mentioned above, the continuous cable wire is preferred.

Thus, the construction of the recliners and the recliner assembly insures a normal full locked condition of each recliner and selective unlocking of both recliners.

While the best mode for carrying out the invention has been described in detail, those familiar with the art to which this invention relates will recognize various alternative designs and embodiments for carrying out the invention as described by the following claims.

What is claimed is:

1. A vehicle seat back recliner comprising:
a stationary member for mounting on a vehicle seat cushion of a vehicle seat with which the recliner is to be used;
a pivotal member that is mounted for pivotal movement about a pivotal axis on the stationary member and that is adapted to mount a seat back of the vehicle seat; and
a locking mechanism for selectively permitting pivotal adjustment and locking of the pivotal position of the pivotal member on the stationary member to pivotally position the seat back with respect to the seat cushion, the locking mechanism including a toothed locking ring on the pivotal member, a pair of toothed pawls mounted on the stationary member for radial movement with respect to the pivotal axis at diametrically opposite locations between locking positions where the pawls are engaged with the toothed locking ring to prevent pivotal movement of the seat back with respect to the seat cushion and unlocked positions where the pawls are disengaged from the locking ring to permit pivotal movement of the seat back with respect to the seat cushion, a pair of separate cams respectively associated with the pair of pawls and moveable with respect to each other and with respect to the pawls on opposite sides of the pivotal axis to respectively slidingly engage the pair of pawls, an operator including a control lever that is pivoted about the pivotal axis in one direction to move the pair of cams so as to move the pair of pawls to the locking positions, and the control lever being pivoted about the pivotal axis in the other direction to move the cams so as to permit movement of the pawls toward the unlocked positions and also moving the pawls from the locking positions to the unlocked positions to permit movement of the pivotal member about the pivotal axis.

2. A vehicle seat recliner assembly that includes a pair of the recliners as in claim 1 for mounting laterally from each other on the vehicle seat, a release mechanism including a release actuator and a cable assembly that extends from the release actuator to each of the recliners, the cable assembly including a sheathing having a pair of ends respectively connected to the stationary members of the pair of recliners and having a pair of intermediate connections to the release actuator, and the cable assembly having a cable wire that extends through the sheathing and has opposite ends respectively connected to the control levers and an intermediate portion that extends to the release actuator and is moved thereby to pivot each control lever in the other direction to move the cams of the recliners so as to permit movement of the pawls of the recliners toward the unlocked positions and also moving the pawls from the locking positions to the unlocked positions to permit movement of the pivotal members of the recliner about the pivotal axis.

3. A vehicle seat back recliner assembly as in claim 2 wherein the cable wire of the cable assembly is continuous between its opposite ends.

4. A vehicle seat back recliner as in claim 1 wherein the operator includes: a pair of first connections each of which includes a curved cam surface and an axial pin that cooperate between the control lever and one of the pawls such that the first pair of connections moves the pair of pawls from the locking positions to the unlocked positions upon pivoting of the control lever about the pivotal axis in said other direction, and a second pair of connections each of which includes a radial slot and an axial pin that connect the control lever and one of the cams such that the second pair of connections move the pair of cams upon pivoting of the control lever about the pivotal axis.

5. A vehicle seat back recliner as in claim 4 wherein the pair of pawls and the pair of cams are located between the stationary member and the pivotal member, the stationary member having a pair of pockets each of which receives one of the pawls and its associated cam, the control lever being located along the pivotal axis on the opposite side of the stationary member from the pawls and cams, and a spring that pivotally biases the control lever about the pivotal axis in said one direction to move the pair of cams so as to move the pair of pawls to the locking positions.

6. A vehicle seat back recliner as in claim 5 further including a pivotal connector extending along the pivotal axis through and between the stationary member and the pivotal member, the pivotal connector being pivotally fixed to the stationary member and supporting the pivotal member for its pivotal movement about the pivotal axis, the pivotal connector having a first end that pivotally supports the control lever, the spring extending between the first end of the pivotal connector and the control lever to provide the biasing of the control lever in said one direction, the pivotal connector having a second end located on the opposite axial side of the stationary and pivotal members as the control lever, and a second spring that extends between the second end of the pivotal connector and the pivotal member to bias the pivotal member in a seat back forward direction.

7. A vehicle seat back recliner as in claim 6 wherein the first mentioned spring comprises a spiral spring having an inner end connected to the first end of the pivotal connector and an outer end connected to the control lever to provide the pivotal biasing thereof, and the second spring is also a spiral spring having an inner end connected to the second end of the pivotal connector and an outer end connected to the pivotal member to provide the pivotal biasing thereof in the seat back forward direction.

8. A vehicle seat back recliner as in claim 5 wherein the stationary member and the pivotal member each include a plate between which the pawls and cams and mounted, and the stationary member and the pivotal member each also including a bracket connected to the plate thereof and operable to respectively provide connection of the recliner to the seat cushion and the seat back.

9. A vehicle seat back recliner comprising:
a stationary member for mounting on a vehicle seat cushion of a vehicle seat with which the recliner is to be used;
a pivotal member that is adapted to mount a seat back of the vehicle seat;
a pivotal connector that extends along a pivotal axis through and between the stationary member and the pivotal member to mount the pivotal member for pivotal movement about the pivotal axis; and
a locking mechanism for selectively permitting pivotal adjustment and locking of the pivotal position of the pivotal member on the stationary member to pivotally position the seat back with respect to the seat cushion, the locking mechanism including a toothed locking ring on the pivotal member, a pair of toothed pawls located between the stationary member and the pivotal member, the stationary member including a pair of pockets for respectively mounting the pair of pawls for radial movement with respect to the pivotal axis at diametrically opposite locations between locking positions where the pawls are engaged with the toothed locking ring to prevent pivotal movement of the seat back with respect to the seat cushion and unlocked positions where the pawls are disengaged from the locking ring to permit pivotal movement of the seat back with respect to the seat cushion, a pair of separate cams located between the stationary member and the pivotal member and respectively associated with the pair of pawls, the pair of cams being received by the pair of pockets of the stationary member for movement with respect to each other and with respect to the pawls on opposite sides of the pivotal axis to respectively slidingly engage the pair of pawls, an operator including a control lever that is mounted on the pivotal connector for pivotal movement about the pivotal axis in one direction to move the pair of cams in the pockets of the stationary member so as to move the pair of pawls in the pockets of the stationary member to the locking positions, and the control lever being pivoted on the pivotal connector about the pivotal axis in the other direction to move the cams in the pockets of the stationary member so as to permit movement of the pawls in the pockets of the stationary member toward the unlocked positions and also moving the pawls from the locking positions to the unlocked positions to permit movement of the pivotal member about the pivotal axis.

10. A vehicle seat back recliner comprising:
a stationary member for mounting on a vehicle seat cushion of a vehicle seat with which the recliner is to be used;
a pivotal member that is adapted to mount a seat back of the vehicle seat;
a pivotal connector that extends along a pivotal axis through and between the stationary member and the pivotal member to mount the pivotal member for pivotal movement about the pivotal axis; and
a locking mechanism for selectively permitting pivotal adjustment and locking of the pivotal position of the pivotal member on the stationary member to pivotally position the seat back with respect to the seat cushion, the locking mechanism including a toothed locking ring on the pivotal member, a pair of toothed pawls located between the stationary member and the pivotal member, the stationary member including a pair of pockets for respectively mounting the pair of pawls for radial movement with respect to the pivotal axis at diametrically opposite locations between locking positions where the pawls are engaged with the toothed locking ring to prevent pivotal movement of the seat back with respect to the seat cushion and unlocked positions where the pawls are disengaged from the locking ring to permit pivotal movement of the seat back with respect to the seat cushion, a pair of separate cams located between the stationary member and the pivotal member and respectively associated with the pair of pawls, the pair of cams being received by the pair of pockets of the stationary member for movement with respect to each other and with respect to the pawls on opposite sides of the pivotal axis to respectively slidingly engage the pair of pawls; and an operator including a control lever that is mounted on the pivotal connector for pivotal movement about the pivotal axis, a first pair of connections each of which includes a curved cam surface and an axial pin that cooperate between one of the pawls and the control lever, a second pair of connections each of which includes a radial slot and an axial pin that connect the control lever and one of the cams such that the second pair of connections move the pair of cams in the pockets of the stationary member upon pivoting of the control lever about the pivotal axis, a spring that biases the control lever about the pivotal axis in one direction such that the second pair of connections move the pair of cams in the pockets of the stationary member so as to move the pair of pawls in the pockets of the stationary member to the locking positions, and the control lever being pivoted on the pivotal connector about the pivotal axis in the other direction such that the second pair of connections move the cams in the pockets of the stationary member so as to permit the first pair of connections to move the pawls in the pockets of the stationary member toward the unlocked positions to permit movement of the pivotal member about the pivotal axis.

11. A vehicle seat recliner assembly comprising:

a pair of recliners for mounting laterally from each other on a vehicle seat, each recliner including:

a. a stationary member for mounting on a vehicle seat cushion of the vehicle seat;

b. a pivotal member that is mounted for pivotal movement about a pivotal axis on the stationary member and that is adapted to mount a seat back of the vehicle seat; and c. a locking mechanism for selectively permitting pivotal adjustment and locking of the pivotal position of the pivotal member on the stationary member to pivotally position the seat back with respect to the seat cushion, the locking mechanism including a toothed locking ring on the pivotal member, a pair of toothed pawls mounted on the stationary member for radial movement with respect to the pivotal axis at diametrically opposite locations between locking positions where the pawls are engaged with the toothed locking ring to prevent pivotal movement of the seat back with respect to the seat cushion and unlocked positions where the pawls are disengaged from the locking ring to permit pivotal movement of the seat back with respect to the seat cushion, a pair of separate cams respectively associated with the pair of pawls and moveable with respect to each other and with respect to the pawls on opposite sides of the pivotal axis to respectively slidingly engage the pair of pawls, an operator including a control lever that is pivotal about the pivotal axis, a spring that biases the control lever in one direction about the pivotal axis to move the pair of cams so as to move the pair of pawls to the locking positions, and the control lever being pivoted about the pivotal axis in the other direction to move the cams so as to permit movement of the pawls toward the unlocked positions and also moving the pawls from the locking positions to the unlocked positions to permit movement of the pivotal member about the pivotal axis; and a release mechanism including a release actuator and a cable assembly that extends from the release actuator to each of the recliners, the cable assembly including a sheathing having a pair of ends respectively connected to the stationary members of the pair of recliners and having a pair of intermediate connections to the release actuator, and the cable assembly having a cable wire that extends through the sheathing and has opposite ends respectively connected to the control levers of the recliners and an intermediate portion that extends to the release actuator and is moved thereby to pivot each control lever against the bias of the spring in the other direction to move the cams of the recliners so as to permit movement of the pawls of the recliners toward the unlocked positions and also moving the pawls from the locking positions to the unlocked positions to permit movement of the pivotal members of the recliners about the pivotal axis.

12. A vehicle seat recliner assembly comprising:

a pair of recliners for mounting laterally from each other on a vehicle seat, each recliner including:

a. a stationary member for mounting on a vehicle seat cushion of the vehicle seat;

b. a pivotal member that is adapted to mount a seat back of the vehicle seat;

c. a pivotal connector that extends along a pivotal axis through and between the stationary member and the pivotal axis to mount the pivotal member for pivotal movement about the pivotal axis;

d. a locking mechanism for selectively permitting pivotal adjustment and locking of the pivotal position of the pivotal member on the stationary member to pivotally position the seat back with respect to the seat cushion, the locking mechanism including a toothed locking ring on the pivotal member, a pair of toothed pawls located between the stationary member and the pivotal member, the stationary member including a pair of pockets for respectively mounting the pair of pawls for radial movement with respect to the pivotal axis at diametrically opposite locations between locking positions where the pawls are engaged with the toothed locking ring to prevent pivotal movement of the seat back with respect to the seat cushion and unlocked positions where the pawls are disengaged from the locking ring to permit pivotal movement of the seat back with respect to the seat cushion, a pair of separate cams located between the stationary member and the pivotal member and respectively associated with the pair of pawls, the pair of cams being received by the pair of pockets of the stationary member for movement with respect to each other and with respect to the pawls on opposite sides of the pivotal axis to respectively slidingly engage the pair of pawls; and e. an operator including a control lever that is mounted on the pivotal connector for pivotal movement about the pivotal axis in one direction to move the pair of cams in the pockets of the stationary member so as to move the pair of pawls in the pockets of the stationary member to the locking positions, and the control lever being pivoted on the pivotal connector about the pivotal axis in the other direction to move the cams in the pockets of the stationary member so as to permit movement of the pawls in the pockets of the stationary member toward the unlocked positions and also moving the pawls from the locking positions to the unlocked positions to permit movement of the pivotal member about the pivotal axis; and a release mechanism including a release actuator and a cable assembly that extends from the release actuator to each of the recliners, the cable assembly including a sheathing having a pair of ends respectively connected to the stationary members of the pair of recliners and having a pair of intermediate connections to the release actuator, and the cable assembly having a cable wire that extends through the sheathing and has opposite ends respectively connected to the control levers of the recliners and an intermediate portion that extends to the release actuator and is moved thereby to pivot each control lever against the bias of the spring in the other direction to move the cams of the recliners so as to permit movement of the pawls of the recliners toward the unlocked positions and also moving the pawls from the locking positions to the unlocked positions to permit movement of the pivotal members of the recliners about the pivotal axis.

13. A vehicle seat recliner assembly comprising:

a pair of recliners for mounting laterally from each other on a vehicle seat, each recliner including:

a. a stationary member for mounting on a vehicle seat cushion of the vehicle seat;

b. a pivotal member that is adapted to mount a seat back of the vehicle seat;

c. a pivotal connector that extends along a pivotal axis through and between the stationary member and the pivotal axis to mount the pivotal member for pivotal movement about the pivotal axis;

d. a locking mechanism for selectively permitting pivotal adjustment and locking of the pivotal position of the pivotal member on the stationary member to pivotally position the seat back with respect to the seat cushion, the locking mechanism including a toothed locking ring on the pivotal member, a pair of toothed pawls located between the stationary member and the pivotal member, the stationary member including a pair of pockets for respectively mounting the pair of pawls for radial movement with respect to the pivotal axis at diametrically opposite locations between locking positions where the pawls are engaged with the toothed locking ring to prevent pivotal movement of the seat back with respect to the seat cushion and unlocked positions where the pawls are disengaged from the locking ring to permit pivotal movement of the seat back with respect to the seat cushion, a pair of separate cams located between the stationary member and the pivotal member and respectively associated with the pair of pawls, the pair of cams being received by the pair of pockets of the stationary member for movement with respect to each other and with respect to the pawls on opposite sides of the pivotal axis to respectively slidingly engage the pair of pawls; and e. an operator including a control lever that is mounted on the pivotal connector for pivotal movement about the pivotal axis, a first pair of connections each of which includes a curved cam surface and an axial pin that cooperate between one of the pawls and the control lever, a second pair of connections each of which includes a radial slot and an axial pin that connect the control lever and one of the cams such that the second pair of connections move the pair of cams in the pockets of the stationary member upon pivoting of the control lever about the pivotal axis, a spring that biases the control lever about the pivotal axis in one direction such that the second pair of connections move the pair of cams in the pockets of the stationary member so as to move the pair of pawls in the pockets of the stationary member to the locking positions, and the control lever being pivoted on the pivotal connector about the pivotal axis in the other direction such that the second pair of connections move the cams in the pockets of the stationary member so as to permit the first pair of connections to move the pawls in the pockets of the stationary member toward the unlocked positions to permit movement of the pivotal member about the pivotal axis; and a release mechanism including a release actuator and a cable assembly that extends from the release actuator to each of the recliners, the cable assembly including a sheathing having a pair of ends respectively connected to the stationary members of the pair of recliners and having a pair of intermediate connections to the release actuator, and the cable assembly having a cable wire that extends through the sheathing and has opposite ends respectively connected to the control levers of the recliners and an intermediate portion that extends to the release actuator and is moved thereby to pivot each control lever against the bias of the spring in the other direction to move the cams of the recliners so as to permit movement of the pawls of the recliners toward the unlocked positions and also moving the pawls from the locking positions to the unlocked positions to permit movement of the pivotal members of the recliners about the pivotal axis.

* * * * *

UNITED STATES PATENT AND TRADEMARK OFFICE
CERTIFICATE OF CORRECTION

PATENT NO. : 6,923,504 B1
DATED : August 2, 2005
INVENTOR(S) : Hsing Lung Lewis Liu and Karl A. Murphy It is certified that error appears in the above-identified patent and that said Letters Patent is hereby corrected as shown below:

Column 9,
Line 55, change "and" (second occurrence) to -- are --.

Signed and Sealed this

Eighth Day of November, 2005

JON W. DUDAS
*Director of the United States Patent and Trademark Office*